(12) United States Patent
Yoshimoto et al.

(10) Patent No.: US 10,093,838 B2
(45) Date of Patent: Oct. 9, 2018

(54) ADHESIVE INCLUDING ETHYLENE•α-OLEFIN COPOLYMER

(71) Applicant: Mitsui Chemicals, Inc., Tokyo (JP)

(72) Inventors: Koya Yoshimoto, Ichihara (JP); Masayoshi Yamaguchi, Chiba (JP); Hidetake Nakano, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/027,584

(22) PCT Filed: Oct. 17, 2014

(86) PCT No.: PCT/JP2014/077714
§ 371 (c)(1),
(2) Date: Apr. 6, 2016

(87) PCT Pub. No.: WO2015/056787
PCT Pub. Date: Apr. 23, 2015

(65) Prior Publication Data
US 2016/0257862 A1 Sep. 8, 2016

(30) Foreign Application Priority Data
Oct. 18, 2013 (JP) .................................. 2013-217628

(51) Int. Cl.
*C08F 210/16* (2006.01)
*C09J 123/08* (2006.01)

(52) U.S. Cl.
CPC ....... *C09J 123/0815* (2013.01); *C08F 210/16* (2013.01)

(58) Field of Classification Search
CPC .... C08F 210/16; C08L 23/16; C09J 123/0815
See application file for complete search history.

(56) References Cited

U.S. PATENT DOCUMENTS

| | | | |
|---|---|---|---|
| 4,990,640 A | 2/1991 | Tsutsui et al. | |
| 5,278,119 A | 1/1994 | Turner et al. | |
| 5,321,106 A | 6/1994 | Lapointe | |
| 5,519,100 A | 5/1996 | Ewen et al. | |
| 5,561,092 A | 10/1996 | Ewen et al. | |
| 5,763,549 A | 6/1998 | Elder et al. | |
| 6,107,430 A | 8/2000 | Dubois et al. | |
| 6,319,979 B1 | 11/2001 | Dubois et al. | |
| 8,173,232 B2 * | 5/2012 | Mandare ................. | B32B 27/32 428/332 |
| 8,835,567 B2 | 9/2014 | Demirors et al. | |
| 8,865,834 B2 * | 10/2014 | Vogt ...................... | C08F 255/02 525/240 |
| 2003/0008997 A1 * | 1/2003 | Murakami ............ | C08F 210/16 526/348 |
| 2004/0127614 A1 * | 7/2004 | Jiang ........................ | C08F 10/00 524/270 |
| 2004/0236002 A1 | 11/2004 | Hassan et al. | |
| 2008/0281037 A1 * | 11/2008 | Karjala ................. | C08F 210/16 524/571 |
| 2009/0105407 A1 | 4/2009 | Karjala et al. | |
| 2009/0202847 A1 | 8/2009 | Eberhardt et al. | |
| 2010/0029873 A1 * | 2/2010 | Crowther ............. | B01J 31/1616 526/134 |
| 2010/0113706 A1 * | 5/2010 | Crowther et al. .... | C08F 210/16 525/342 |
| 2010/0160497 A1 * | 6/2010 | Karjala et al. ............ | C08F 8/00 524/13 |
| 2010/0298508 A1 | 11/2010 | Michie et al. | |
| 2011/0015346 A1 * | 1/2011 | Hermel-Davidock ....................... | C08F 10/00 525/55 |
| 2011/0097523 A1 * | 4/2011 | Bernal-Lara ............... | C08J 5/18 428/35.2 |
| 2012/0245311 A1 * | 9/2012 | Crowther ................. | B01J 31/12 526/126 |
| 2013/0046061 A1 | 2/2013 | Hermel-Davidock et al. | |
| 2013/0085221 A1 * | 4/2013 | Botros ................... | C09J 151/06 524/504 |
| 2013/0210990 A1 | 8/2013 | Demirors et al. | |

FOREIGN PATENT DOCUMENTS

| | | |
|---|---|---|
| EP | 0 277 004 A1 | 8/1988 |
| EP | 0 426 637 A2 | 5/1991 |
| JP | H01-501950 A | 7/1989 |
| JP | H01-502036 A | 7/1989 |
| JP | H02-078687 A | 3/1990 |
| JP | H03-179005 A | 8/1991 |
| JP | H03-179006 A | 8/1991 |
| JP | H03-207704 A | 9/1991 |
| JP | H03-2077036 A | 9/1991 |
| JP | 2000-507283 A | 6/2000 |
| JP | 2000-515190 A | 11/2000 |
| JP | 2004-051676 A | 2/2004 |
| JP | 2007-504350 A | 3/2007 |
| JP | 2008-524431 A | 7/2008 |
| JP | 2010-501691 A | 1/2010 |
| JP | 2011-511107 A | 4/2011 |
| JP | 2012-532218 A | 12/2012 |
| JP | 2013-521382 A | 6/2013 |
| WO | WO-2002/008305 A1 | 1/2002 |
| WO | WO 2011/002868 A2 | 1/2011 |
| WO | WO 2011/109563 A2 | 9/2011 |
| WO | WO 2012/061168 A1 | 5/2012 |

OTHER PUBLICATIONS

International Search Report for PCT/JP2014/077714 dated Jan. 13, 2015.
Extended European Search Report dated May 8, 2017 in corresponding European Patent Application No. 14854513.0.

* cited by examiner

*Primary Examiner* — Rip A Lee
(74) *Attorney, Agent, or Firm* — Foley & Lardner LLP

(57) ABSTRACT

An adhesive with improved heat stability is provided. The adhesive includes an ethylene•α-olefin copolymer (A) having a number-average molecular weight of 5000 to 100000 in terms of polystyrene as measured by gel permeation chromatography and a density of 860 to 970 kg/m$^3$, wherein in the ethylene•α-olefin copolymer (A), the total number of vinyl-type double bond, vinylidene-type double bond, 2-substituted olefin-type double bond and 3-substituted olefin-type double bond is less than 0.5 per 1000 carbon atoms as measured by $^1$H-NMR.

7 Claims, No Drawings

ADHESIVE INCLUDING ETHYLENE·α-OLEFIN COPOLYMER

TECHNICAL FIELD

The present invention relates to an adhesive, particularly to a hot-melt adhesive.

BACKGROUND ART

Adhesives are widely used in the fields of packaging, bookbinding, plywood, woodworking and the like. For instance, hot-melt adhesives are, after their application, cooled and solidified to provide initial bonding in a short period of time, and they provide significantly good workability and are solvent-free, leading to year-by-year increase of their use amount.

Conventionally, a base polymer of the hot-melt adhesives has been an ethylene·vinyl acetate copolymer (EVA). In recent years, polymers with a lower density, for example, ethylene·α-olefin copolymers, are used in view of e.g., cost cut (See Patent Literatures 1 and 2, for example).

Patent Literature 1 describes an adhesive using an ethylene·α-olefin copolymer, but fails to indicate whether properties such as heat stability of that adhesive are satisfactory or not.

Patent Literature 3 describes an ethylene·α-olefin copolymer having less amount of double bond in the polymer, excellent in mechanical properties, in molding processability and thermal stability at the time of mold processing, and in heat aging resistance. This literature indicates that copolymer is applicable to industrial uses including waterproof sheets, tatami mat facings, carpet backing materials, architecture, civil engineering pipes, medicine, daily necessaries and protective films, but fails to indicate whether the copolymer is employable as a material of an adhesive.

CITATION LIST

Patent Literature

[Patent Literature 1] JP-A-2000-507283
[Patent Literature 2] JP-A-2000-515190
[Patent Literature 3] WO-A-02/08305

SUMMARY OF THE INVENTION

Technical Problem

Adhesives containing a conventional ethylene·α-olefin copolymer as a base polymer fail to have satisfactory heat stability. An object of the present invention is thus to improve the heat stability of adhesives.

Technical Solution

To solve the above-mentioned problem, the present inventors made their earnest studies.

As a result, they have found that an adhesive comprising an ethylene·α-olefin copolymer having a configuration described below is excellent in heat stability. The present invention has been completed based on this finding.

The present invention relates to [1] to [7] indicated below.

[1] An adhesive comprising an ethylene·α-olefin copolymer (A) having a number-average molecular weight of 5000 to 100000 in terms of polystyrene as measured by gel permeation chromatography and a density of 860 to 970 kg/m$^3$, wherein in the ethylene·α-olefin copolymer (A), the total number of vinyl-type double bond, vinylidene-type double bond, 2-substituted olefin-type double bond and 3-substituted olefin-type double bond is less than 0.5 per 1000 carbon atoms as measured by $^1$H-NMR.

[2] The adhesive described in the [1], wherein the copolymer (A) has a number-average molecular weight of 20000 to 100000 in terms of polystyrene as measured by gel permeation chromatography and has a density of from 896 to 970 kg/m$^3$.

[3] The adhesive described in the [1] or [2], wherein in the copolymer (A), the number of each of vinylidene-type double bond, 2-substituted olefin-type double bond and 3-substituted olefin-type double bond is less than 0.2 per 1000 carbon atoms as measured by $^1$H-NMR.

[4] The adhesive described in any one of the [1] to [3], wherein in the copolymer (A), the number of vinyl-type double bond is less than 0.2 per 1000 carbon atoms as measured by $^1$H-NMR.

[5] The adhesive described in any one of the [1] to [4], wherein in the copolymer (A), the total number of vinyl-type double bond, vinylidene-type double bond, 2-substituted olefin-type double bond and 3-substituted olefin-type double bond is less than 0.4 per 1000 carbon atoms as measured by $^1$H-NMR.

[6] The adhesive described in any one of the [1] to [5], wherein the copolymer (A) has a density of 896 to 905 kg/m$^3$.

[7] The adhesive described in any one of the [1] to [6], which is a hot-melt adhesive.

Effects of the Invention

An adhesive in an embodiment of the present invention which uses the copolymer having less amount of double bond can have improved heat stability. An adhesive in an embodiment of the present invention which uses the ethylene·α-olefin copolymer having a number-average molecular weight and a density in specific ranges can have improved adhesion under high-temperature environment.

DESCRIPTION OF EMBODIMENTS

The adhesives of the present invention, together with their preferred embodiments, will be described.

[Adhesive]

The adhesive of the present invention includes a specific ethylene·α-olefin copolymer (A).

The adhesive of the present invention may be used as a hot-melt adhesive, which is solid at ordinary temperature and in its use heated and molten to be fluidized for bonding of various adherends.

<Ethylene·α-Olefin Copolymer (A)>

The ethylene·α-olefin copolymer (A) is a copolymer having a structural unit derived from ethylene and a structural unit derived from an α-olefin. One kind of the α-olefins as a copolymerization component (ethylene is excluded therefrom) may be used, or two or more kinds thereof may be used.

Examples of the α-olefins include linear or branched α-olefins. The number of carbons of the α-olefins is preferably 3 to 20, and more preferably 3 to 10. Specific examples of the α-olefins include propylene, 1-butene, 1-pentene, 3-methyl-1-butene, 1-hexene, 4-methyl-1-pentene, 3-methyl-1-pentene, 1-octene, 1-decene and 1-dodecene. Among these, 1-butene, 1-hexene, 4-methyl-1-pentene and 1-octene are preferred.

The content of the structural unit derived from ethylene in the copolymer (A) is usually 85 to 97 mol %, preferably 88 to 96 mol %, and more preferably 90 to 95 mol %, of all the repeating structural units. The content of the structural unit derived from the α-olefin in the copolymer (A) is usually 3 to 15 mol %, preferably 4 to 12 mol %, and more preferably 5 to 10 mol %, of all the repeating structural units. It is preferred that the content of the structural unit derived from ethylene and the content of the structural unit derived from the α-olefin total 100 mol % of all the repeating structural unit.

The type of the α-olefins constituting the copolymer (A) is clear from the type of monomers for copolymerization in producing the copolymer (A). The type of the structural unit derived from the α-olefin in the copolymer (A) can be identified, for example, by preparing a sample given when about 200 mg of the copolymer (A) is homogenously dissolved in 1 ml of hexachlorobutadiene in a sample tube having a diameter of 10 mm and then by analyzing a $^{13}$C-NMR spectrum of that sample under measurement conditions of a temperature of 120° C., a frequency of 25.05 MHz, a spectrum width of 1500 Hz, a pulse repeating time of 4.2 sec and a 45° pulse width of 6 µsec.

(1) Number-Average Molecular Weight (Mn)

The copolymer (A) has a number-average molecular weight (Mn) which is usually not less than 5000, preferably not less than 13000, and more preferably not less than 20000. The copolymer (A) has a number-average molecular weight (Mn) which is usually not more than 100000, preferably not more than 50000, and more preferably not more than 30000. The Mn in a preferred embodiment is usually 5000 to 100000, preferably 13000 to 100000, more preferably 20000 to 100000, still more preferably 20000 to 50000, and particularly preferably 20000 to 30000. The Mn is a value which is in terms of polystyrene and is measured by gel permeation chromatography (GPC).

The copolymer (A) having Mn in the above ranges gives an adhesive which even when exposed to high-temperature environment (example: 50 to 80° C.) has a viscosity not excessively low and exhibits high adhesion. The copolymer (A) having Mn in the above ranges whose lower limits are as described above and having a density in specific ranges described later includes less amount of low-molecular-weight component and less amount of low-crystalline component, thus preventing the blocking of pellets. Using the copolymer (A) having Mn in the above ranges and filling a requirement described later for the amount of double bond results in contributing more to its heat stability in some cases.

(2) Density

The copolymer has a density which is usually not less than 860 kg/m$^3$, preferably not less than 865 kg/m$^3$, more preferably not less than 876 kg/m$^3$, still more preferably not less than 896 kg/m$^3$, and particularly preferably not less than 900 kg/m$^3$. The copolymer (A) has a density which is usually not more than 970 kg/m$^3$, preferably not more than 960 kg/m$^3$, and more preferably not more than 905 kg/m$^3$. The density in a preferred embodiment is usually 860 to 970 kg/m$^3$, preferably 865 to 970 kg/m$^3$, more preferably 876 to 970 kg/m$^3$, still more preferably 896 to 970 kg/m$^3$, and particularly preferably 896 to 905 kg/m$^3$. The density of the copolymer (A) is a value measured at 23° C. in accordance with ASTM D 1505.

Using the copolymer (A) having a density and Mn in the above ranges can provide an adhesive which is excellent in adhesion under high-temperature environment and which provides good coatability even when a melt-treating temperature at the time of coating is low (example: 130 to 150° C.) and is therefore advantageous in terms of saving energy. Using the copolymer (A) having a density in the above preferred ranges can provide an adhesive which is excellent also in adhesion under low-temperature environment (example: −30 to 0° C.).

(3) Amount of Double Bond

The double bond that can be contained in the ethylene•α-olefin copolymer are for example those described below: vinyl-type double bond, vinylidene-type double bond, 2-substituted olefin-type double bond, and 3-substituted olefin-type double bond.

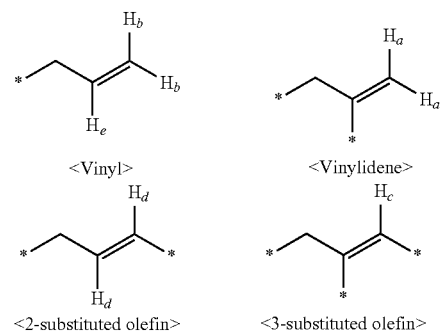

<Vinyl>   <Vinylidene>

<2-substituted olefin>   <3-substituted olefin>

In each formula, * represents a bond with an atom other than a hydrogen atom.

In the copolymer (A), the number of at least any of vinyl-type double bond, vinylidene-type double bond, 2-substituted olefin-type double bond and 3-substituted olefin-type double bond is preferably less than 0.2, more preferably less than 0.1, and still more preferably from 0 to 0.09, per 1000 carbon atoms.

In the copolymer (A), the total number of vinyl-type double bond, vinylidene-type double bond, 2-substituted olefin-type double bond and 3-substituted olefin-type double bond is preferably less than 0.5 and more preferably less than 0.4, per 1000 carbon atoms.

In the copolymer (A), the number of each of vinylidene-type double bond, 2-substituted olefin-type double bond and 3-substituted olefin-type double bond is preferably less than 0.2, more preferably less than 0.1, and still more preferably from 0 to 0.09, per 1000 carbon atoms.

In the copolymer (A), the number of vinyl-type double bond is preferably less than 0.2, more preferably less than 0.1, and still more preferably from 0 to 0.09, per 1000 carbon atoms. In the copolymer (A), the vinyl-type double bond, due to its chemical structure, is more likely to be a cause of inferior heat stability described later than vinylidene-type double bond, the 2-substituted olefin-type double bond and 3-substituted olefin-type double bond. For this reason, it is particularly preferred that the number of the vinyl-type double bond is in the above ranges.

The amount of double bond can be determined by $^1$H-NMR.

If in the copolymer (A) the amount of double bond per 1000 carbon atoms exceeds the above range, crosslinking can occur to lead to scorching at the time of, for example, applying the adhesive. On the other hand, when the amount of double bond is in the above range, even when the adhesive is treated at high temperature (example: about 180° C.) for long hours at the time of, for example, applying the adhesive, gels causing scorching hardly occur. Thus, the adhesive containing the copolymer (A), even when treated at high temperature for long hours, for example in a nozzle of a processing device, is prevented from its discoloration and is therefore excellent in heat stability. That effect can be more noticeable when the copolymer (A) has a number-average molecular weight (Mn) in the above-described ranges.

(4) Melting Point (Tm)

The copolymer (A) has a melting point (Tm) which is usually 40 to 120° C., preferably 80 to 105° C., and more preferably 85 to 100° C. By using the copolymer (A) having a melting point in the above ranges, the resultant adhesive even when exposed to high-temperature environment is free from drawdown, being able to retain adhesion and being provided with good coatability. The melting point can be measured by differential scanning calorimetry (DSC).

(5) Melt Flow Rate (MFR)

A melt flow rate at 190° C. under 2.16 kg load (MFR, ASTM D 1238) of the copolymer (A), which may be selected depending on its use, is not particularly limited: the lower limit is usually 100 g/10 min, preferably 200 g/10 min, and more preferably 300 g/10 min; and the upper limit is usually 1000 g/10 min, and preferably 500 g/10 min. The MFR in a preferred embodiment is usually from 100 to 1000 g/10 min, and preferably from 300 to 500 g/10 min. When MFR is in the above ranges, good balance between cohesion and coatability of a hot-melt adhesive is achieved.

(6) Molecular Weight Distribution (Mw/Mn)

The copolymer (A) has a molecular weight distribution (Mw/Mn) which is preferably not more than 3.5, and more preferably not more than 3.0. The Mw/Mn is a value in terms of polystyrene and is measured by GPC. The copolymer (A) having Mw/Mn in the above ranges is preferred in terms of blocking resistance of pellets.

(7) Melt Viscosity

The copolymer (A) has a melt viscosity as measured with a B-type viscometer (177° C., 1.0 rpm) whose lower limit is usually 5000 mPa·s, preferably 10000 mPa·s, and more preferably 17500 mPa·s, and whose upper limit is usually 300000 mPa·s, preferably 100000 mPa·s, and more preferably 50000 mPa·s. When the melt viscosity is in the above ranges, good balance between cohesion and coatability of a hot-melt adhesive is achieved.

<Process for Producing Ethylene•α-Olefin Copolymer (A)>

The ethylene•α-olefin copolymer (A) has the above-described properties, and its production process is in no way limited. For example, the copolymer (A) can be produced by copolymerizing ethylene with an α-olefin in the presence of an olefin polymerization catalyst including catalyst components [A] and [B].

<Catalyst Component [A]>

The catalyst component [A] is a metallocene compound represented by Formula [I]:

[I]

wherein M is a transition metal; p is a valence of a transition metal; Xs may be the same or different from each other, and are each independently a hydrogen atom, a halogen atom or a hydrocarbon group; and $R^1$ and $R^2$ are each independently a n-electron conjugated ligand coordinating to M.

Examples of the transition metal represented by M include Zr, Ti, Hf, V, Nb, Ta and Cr. The transition metal is preferably Zr, Ti or Hf; and more preferably Zr or Hf.

Examples of the n-electron conjugated ligand represented by $R^1$ and $R^2$ include ligands having a η-cyclopentadienyl structure, a η-benzene structure, a η-cycloheptatrienyl structure or a η-cyclooctatetraene structure. A particularly preferred ligand is a ligand having a η-cyclopentadienyl structure. Examples of the ligand having a η-cyclopentadienyl structure include a cyclopentadienyl group, an indenyl group, a hydrogenated indenyl group and a fluorenyl group. These groups may be further substituted with, for example, a halogen atom; a hydrocarbon group such as an alkyl, an aryl and an aralkyl; an oxygen atom-containing group such as an alkoxy group and an aryloxy group; or a hydrocarbon group-containing silyl group such as a trialkylsilyl group.

An example of the catalyst component [A] is bis(1,3-dimethylcyclopentadienyl)zirconiumdichloride, but the catalyst component [A] is not limited to that compound. It is preferred to use such a catalyst component [A] together with the catalyst component [B], as an olefin polymerization catalyst.

<Catalyst Component [B]>

The catalyst component [B] is at least one compound selected from (b-1) organoaluminum oxy-compound, (b-2) compound capable of reacting with the catalyst component [A] to form an ion pair, and (b-3) organoaluminum compound.

The catalyst component [B] preferably used is any of the following embodiments in view of polymerization activity and properties of the resultant olefin polymers.

[1] organoaluminum oxy-compound (b-1) alone
[2] organoaluminum oxy-compound (b-1) and organoaluminum compound (b-3)
[3] the compound (b-2) and organoaluminum compound (b-3)
[4] organoaluminum oxy-compound (b-1) and the compound (b-2)

<<Organoaluminum Oxy-Compound (b-1)>>

As the organoaluminum oxy-compound (b-1), hitherto publicly known aluminoxane may be used as it is. Specifically, exemplary compounds are those represented by Formula [II] and/or Formula [III].

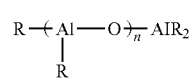

[II]

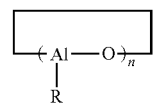

[III]

In Formula [II] or [III], R is a hydrocarbon group having 1 to 10 carbon atoms; and n is an integer of 2 or more. Methylaluminoxanes, represented by the formulae in which R is a methyl group, wherein n is 3 or more, and preferably 10 or more, are used suitably. An organoaluminum oxy-compound represented by Formula [II] or [III] wherein R is a methyl group is also referred to as the "methylaluminoxane" hereinafter.

As the organoaluminum oxy-compound (b-1), it is also preferred to use methylaluminoxane analogues soluble in saturated hydrocarbons: examples thereof are modified methylaluminoxanes as represented by Formula [IV].

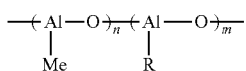

[IV]

In Formula [IV], R is a hydrocarbon group having 2 to 20 carbon atoms; and m and n are each an integer of 2 or more.

The modified methylaluminoxane represented by Formula [IV] is prepared using trimethylaluminum and an alkylaluminum other than trimethylaluminum. Compounds prepared by using trimethylaluminum and tri-isobutyl aluminum wherein R is an isobutyl group are commercially available under the product name of MMAO or TMAO from Tosoh Finechem Corporation and the like.

The organoaluminum oxy-compounds (b-1) may be benzene-insoluble organoaluminum oxy-compounds as described in JP-A-H02-78687, or may be boron-containing organoaluminum oxy-compounds represented by Formula [V].

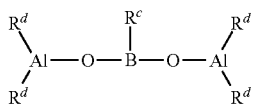

[V]

In Formula [V], $R^c$ is a hydrocarbon group having 1 to 10 carbon atoms; and $R^d$ are each a hydrogen atom, a halogen atom or a hydrocarbon group having 1 to 10 carbon atoms, and may be the same or different from one another.

The organoaluminum oxy-compound (b-1) may be used singly, or two or more kinds thereof may be used in combination. The organoaluminum oxy-compound (b-1) may contain a trace amount of organoaluminum compounds.

<<(b-2) Compound Capable of Reacting with Catalyst Component [A] to Form Ion Pair>>

Examples of the compound (b-2) capable of reacting with the catalyst component (A) to form an ion pair (abbreviated in some cases hereinafter as the "ionic compound (b-2)") include Lewis acids, ionic compounds, borane compounds and carborane compounds as described in JP-A-H01-501950, JP-A-H01-502036, JP-A-H03-179005, JP-A-H03-179006, JP-A-H03-207703, JP-A-H03-207704, and U.S. Pat. No. 5,321,106. Heteropoly compounds and isopoly compounds may also be mentioned as the ionic compound (b-2).

The ionic compound (b-2) is preferably a compound represented by Formula [VI].

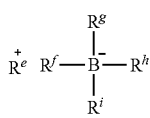

[VI]

In Formula [VI], $R^{e+}$ may be $H^+$, carbenium cation, oxonium cation, ammonium cation, phosphonium cation, cycloheptyltrienyl cation, or ferrocenium cation having a transition metal; and $R^f$ to $R^i$ may be the same or different from one another and are each an organic group, and preferably an aryl group.

Examples of the carbenium cation include tri-substituted carbenium cations such as triphenylcarbenium cation, tris(methylphenyl)carbenium cation and tris(dimethylphenyl) carbenium cation.

Examples of the ammonium cation include trialkylammonium cations such as trimethylammonium cation, triethylammonium cation, tri(n-propyl)ammonium cation, triisopropylammonium cation, tri(n-butyl)ammonium cation and triisobutylammonium cation; N,N-dialkylanilinium cations such as N,N-dimethylanilinium cation, N,N-diethylanilinium cation and N,N,2,4,6-pentamethylanilinium cation; and dialkylammonium cations such as diisopropylammonium cation and dicyclohexylammonium cation.

Examples of the phosphonium cation include triarylphosphonium cations such as triphenylphosphonium cation, tris(methylphenyl)phosphonium cation and tris(dimethylphenyl)phosphonium cation.

Among the above, $R^{e+}$ is preferably carbenium cation or ammonium cation, and particularly preferably triphenylcarbenium cation, N,N-dimethylanilinium cation or N,N-diethylanilinium cation.

Specific examples of carbenium salts as the ionic compound (b-2) include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate and tris(3,5-dimethylphenyl)carbenium tetrakis(pentafluorophenyl)borate.

Examples of ammonium salts as the ionic compound (b-2) include trialkyl-substituted ammonium salts, N,N-dialkylanilinium salts and dialkylammonium salts.

Specific examples of the trialkyl-substituted ammonium salts as the ionic compound (b-2) include triethylammoniumtetraphenylborate, tripropylammoniumtetraphenylborate, tri(n-butyl)ammoniumtetraphenylborate, trimethylammoniumtetrakis(p-tolyl)borate, trimethylammoniumtetrakis(o-tolyl)borate, tri(n-butyl)ammoniumtetrakis(pentafluorophenyl)borate, triethylammoniumtetrakis(pentafluorophenyl)borate, tripropylammoniumtetrakis(pentafluorophenyl)borate, tripropylammoniumtetrakis(2,4-dimethylphenyl)borate, tri(n-butyl)ammoniumtetrakis(3,5-dimethylphenyl)borate, tri(n-butyl)ammoniumtetrakis(4-trifluoromethylphenyl)borate, tri(n-butyl)ammoniumtetrakis(3,5-ditrifluoromethylphenyl)borate, tri(n-butyl)ammoniumtetrakis(o-tolyl)borate, dioctadecylmethylammoniumtetraphenylborate, dioctadecylmethylammoniumtetrakis(p-tolyl)borate, dioctadecylmethylammoniumtetrakis(o-tolyl)borate, dioctadecylmethylammoniumtetrakis(pentafluorophenyl)borate, dioctadecylmethylammoniumtetrakis(2,4-dimethylphenyl)borate, dioctadecylmethylammoniumtetrakis(3,5-dimethylphenyl)borate, dioctadecylmethylammoniumtetrakis(4-trifluoromethylphenyl)borate, and dioctadecylmethylammoniumtetrakis(3,5-ditrifluoromethylphenyl)borate.

Specific examples of the N,N-dialkylanilinium salts as the ionic compound (b-2) include N,N-dimethylaniliniumtetraphenylborate, N,N-dimethylaniliniumtetrakis(pentafluorophenyl)borate, N,N-dimethylaniliniumtetrakis(3,5-ditrifluoromethylphenyl)borate, N,N-diethylaniliniumtetraphenylborate, N,N-diethylaniliniumtetrakis(pentafluorophenyl)borate, N,N-diethylaniliniumtetrakis(3,5-ditrifluoromethylphenyl)borate, N,N,2,4,6-pentamethylaniliniumtetraphenylborate and N,N,2,4,6-pentamethylaniliniumtetrakis(pentafluorophenyl)borate.

Specific examples of the dialkylammonium salts include di(1-propyl)ammonium tetrakis(pentafluorophenyl)borate and dicyclohexylammonium tetraphenylborate.

Furthermore, as the ionic compound (b-2), ionic compounds disclosed by the present applicant (JP-A-2004-51676) are employable without limitation.

The ionic compound (b-2) may be used singly, or two or more kinds thereof may be used in combination.

<<Organoaluminum Compound (b-3)>>

Examples of the organoaluminum compound (b-3) include organoaluminum compounds represented by Formula [VII] and alkyl complex compounds containing a Group 1 metal of the periodic table and aluminum which are represented by Formula [VIII].

$$R^a{}_m Al(OR^b)_n H_p X_q \quad \text{[VII]}$$

In Formula [VII], $R^a$ and $R^b$ may be the same or different from each other and are each a hydrocarbon group having 1 to 15 carbon atoms, and preferably a hydrocarbon group 1 to 4 carbon atoms; X is a halogen atom; and $0<m\leq3$, $0\leq n<3$, $0\leq p<3$, $0\leq q<3$ and $m+n+p+q=3$.

Specific examples of the organoaluminum compounds represented by Formula [VII] include:

tri(n-alkyl)aluminums such as trimethylaluminum, triethylaluminum, tri(n-butyl)aluminum, trihexylaluminum and trioctylaluminum;

branched-chain trialkylaluminums such as triisopropylaluminum, tri isobutylaluminum, tri(sec-butyl)aluminum, tri(tert-butyl)aluminum, tri(2-methylbutyl)aluminum, tri(3-methylhexyl)aluminum and tri(2-ethylhexyl)aluminum;

tricycloalkylaluminums such as tricyclohexylaluminum and tricyclooctylaluminum;

triarylaluminums such as triphenylaluminum and tritolylaluminum;

dialkylaluminumhydrides such as diisopropylaluminumhydride and diisobutylaluminumhydride;

alkenylaluminums such as those represented by the general formula: $(i-C_4H_9)_x Al_y (C_5H_{10})_z$ (wherein x, y and z are each a positive number, and $z\leq2x$) with examples including isoprenylaluminum;

alkylaluminum alkoxides such as isobutylaluminum methoxide and isobutylaluminum ethoxide;

dialkylaluminum alkoxides such as dimethylaluminum methoxide, diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminums such as those having an average composition represented by the general formula: $R^a{}_{2.5} Al(OR^b)_{0.5}$;

alkylaluminum aryloxides such as diethylaluminum phenoxide and diethylaluminum(2,6-di-t-butyl-4-methylphenoxide);

dialkylaluminum halides such as dimethylaluminum chloride, diethylaluminum chloride, dibutylaluminum chloride, diethylaluminum bromide and diisobutylaluminum chloride;

alkylaluminum sesquihalides such as ethylaluminum sesquichloride, butylaluminum sesquichloride and ethylaluminum sesquibromide;

partially halogenated alkylaluminums such as alkylaluminum dihalides including ethylaluminum dichloride;

dialkylaluminum hydrides such as diethylaluminum hydride and dibutylaluminum hydride;

partially hydrogenated alkylaluminums such as alkylaluminum dihydrides including ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

$$M^2 Al R^a{}_4 \quad \text{[VIII]}$$

In Formula [VIII], $M^2$ is Li, Na or K; and $R^a$ is a hydrocarbon group having 1 to 15 carbon atoms, preferably a hydrocarbon group having 1 to 4 carbon atoms. Examples of such compounds include $LiAl(C_2H_5)_4$ and $LiAl(C_7H_{15})_4$.

Compounds analogous to the compounds represented by Formula [VII] are also employable. Examples of such compounds include organoaluminum compounds wherein two or more aluminum compounds are bonded via a nitrogen atom. Specific examples thereof include $(C_2H_5)_2AlN(C_2H_5)Al(C_2H_5)_2$.

In terms of easy availability, as the organoaluminum compound (b-3), trimethylaluminum and triisobutylaluminum are preferably used.

The organoaluminum compound (b-3) may be used singly, or two or more kinds thereof may be used in combination.

<Polymerization Conditions>

The copolymer (A) can be suitably produced by copolymerizing ethylene with an α-olefin in the presence of the above-mentioned olefin polymerization catalyst. The way the copolymerization is performed is not particularly limited, but it is preferred to perform the copolymerization by solution polymerization performed in the presence of the olefin polymerization catalyst with a solvent co-present at a temperature of 50 to 180° C.

Examples of the α-olefin include linear or branched α-olefins. The number of carbons of the α-olefin is preferably 3 to 20, and more preferably 3 to 10. Specific examples of the α-olefin include propylene, 1-butene, 1-pentene, 3-methyl-1-butene, 1-hexene, 4-methyl-1-pentene, 3-methyl-1-pentene, 1-octene, 1-decene and 1-dodecene. Among these, 1-butene, 1-hexene, 4-methyl-1-pentene and 1-octene are preferred.

In the polymerization, how to use the individual components and the order of adding them are arbitrarily selected: for example, the catalyst component [A] and the catalyst component [B] may be added into a polymerization device in an arbitrary order. In the above method, two or more of the catalyst components may be contacted with each other beforehand.

When the olefin polymerization catalyst is used to copolymerize ethylene with the α-olefin to produce the copolymer (A), the catalyst component [A] may be used in such an amount that its amount per 1 liter of reaction volume is usually $10^{-9}$ to $10^{-1}$ mol, and preferably $10^{-8}$ to $10^{-2}$ mol.

The component (b-1) may be used in such an amount that a molar ratio [(b-1)/M] of the component (b-1) to all the transition metal atoms (M) in the component [A] is usually from 1 to 10000, and preferably from 10 to 5000. The component (b-2) may be used in such an amount that a molar ratio [(b-2)/M] of the component (b-2) to all the transition metal atoms (M) in the component [A] is usually from 0.5 to 50, and preferably 1 to 20. The component (b-3) may be used in such amount that its amount per 1 liter of polymerization volume is usually 0 to 5 mmol, and preferably about 0 to 2 mmol.

The feed molar ratio between ethylene and α-olefin is appropriately selected according to desired properties of the copolymer (A), not being particularly limited, but usually, ethylene:α-olefin=10:90 to 99.9:0.1, preferably ethylene:α-olefin=30:70 to 99.9:0.1, and still more preferably ethylene:α-olefin=50:50 to 95.0:5.0.

The "solution polymerization", which is preferably adopted in the production of the copolymer (A), is a term to collectively refer to methods in which polymerization is performed in such a manner that polymers are dissolved in a hydrocarbon solvent inert to copolymerization reaction.

Polymerization temperature in solution polymerization is usually 50 to 180° C., preferably 70 to 150° C., and more preferably 90 to 130° C.

In solution polymerization, the polymerization temperature in the above range is preferred in terms of polymerization activity, removing polymerization heat, and reducing the amount of double bond in the copolymer (A). Specifically, the polymerization temperature being not less than the lower limit in the above range is preferred in terms of productivity; and the polymerization temperature being not more than the upper limit in the above range is preferred in terms of inhibiting branches from occurring in the polymer to attain blocking resistance.

Polymerization pressure is usually ordinary pressure to 10 MPa gauge pressure, and preferably ordinary pressure to 8 MPa gauge pressure. The copolymerization may be performed by any of batchwise method, semi-continuous method and continuous method. Reaction time (mean residence time when copolymerization reaction is performed by continuous method), varying depending on conditions such as catalyst concentration and polymerization temperature and selectable as needed, is usually 1 minute to 3 hours, and preferably 10 minutes to 2.5 hours.

The polymerization may be performed separately in two or more stages differing in reaction conditions.

The molecular weight of the resultant copolymer (A) can be adjusted also by varying a hydrogen concentration and a polymerization temperature in polymerization system. The adjustment is possible also by controlling the amount of the catalyst component [B] to be used. In the cases where hydrogen is added into the polymerization system, its amount that is appropriate is about 0.001 to 5,000 NL per 1 kg of the copolymer (A) obtained. The density of the resultant copolymer (A) can be adjusted by controlling feed amount of α-olefins. The amount of double bond can be reduced by appropriately setting polymerization temperature and polymerization catalyst.

Solvents used in solution polymerization are usually inert hydrocarbon solvents, and are preferably saturated hydrocarbons whose boiling point under ordinary pressure is from 50 to 200° C. Specific examples thereof include aliphatic hydrocarbons such as pentane, hexane, heptane, octane, decane, dodecane and kerosene; and alicyclic hydrocarbons such as cyclopentane, cyclohexane and methylcyclopentane. In addition, aromatic hydrocarbons such as benzene, toluene and xylene; and halogenated hydrocarbons such as ethylene chloride, chlorobenzene and dichloromethane also fall within the "inert hydrocarbon solvents", and their use is not limited.

To inhibit property values from dispersing, the copolymer (A) obtained through polymerization reaction and other components to be added optionally preferably undergo processes such as melting, kneading and granulation in an arbitrary manner.

<Tackifier>

The adhesive of the present invention may contain a tackifier, as needed.

An example of the tackifier is at least one resin selected from natural rosins, modified rosins, polyterpene-based resins, synthetic petroleum resins, coumarone-based resins, phenolic resins, xylene-based resins, styrene-based resins, low-molecular-weight styrene-based resins and isoprene-based resins. Among these, rosin-based resins, polyterpene-based resins and synthetic petroleum resins are preferred; and those having an aliphatic and/or an alicyclic structure are more preferred.

Examples of petroleum resins having an aliphatic and/or an alicyclic structure that are particularly preferred include rosin-based resins which are partially or completely hydrogenated rosins and their derivatives; polyterpene-based resins which are homopolymers or copolymers of cyclic terpenes; and synthetic petroleum resins which are aliphatic petroleum resins, alicyclic-based petroleum resins, aliphatic-alicyclic copolymerized resins and hydrogenated copolymers of naphtha-cracked oil and various types of terpenes.

Preferred tackifiers are those having a softening point ranging from 25 to 160° C. By the softening point being 25° C. or higher, bleeding onto the surfaces can be prevented, and by the softening point being 160° C. or lower, the viscosity at the time of melting is prevented from being excessively high, and good processability is achieved. Specific examples preferably used include products named "ARKON P-70", "ARKON P-90", "ARKON P-100", "ARKON P-115", "ARKON P-125", "ARKON P-140" (each of these is manufactured by Arakawa Chemical Industries, Ltd.).

One kind of the tackifiers may be used, or two or more kinds thereof may be used in combination.

<Wax>

The adhesive of the present invention may contain a wax as needed.

Examples of the wax include synthetic waxes such as Fischer-Tropsch wax, polyethylene wax, polypropylene wax and atactic polypropylene; petroleum waxes such as paraffin wax and microcrystalline wax; and natural waxes such as sumac wax, carnauba wax and beeswax.

The wax has a melt viscosity preferably from 10 to 8000 mPa·s, and more preferably 100 to 1000 mPa·s as measured with a B-type viscometer (140° C., 6.0 rpm). The melt viscosity being in the above range is preferred in terms of cohesion and kneading processability.

The wax has a melting point preferably from 80 to 150° C., and more preferably 90 to 140° C. as measured by DSC. The melting point being in the above ranges is preferred in terms of flexibility and kneading processability at the time of using the adhesive.

Examples of commercially available products of the wax include product named "Mitsui HiWAX 420P", and product named "Mitsui HiWAX NL100" (each of these is manufactured by Mitsui Chemicals, Inc.).

One kind of the waxes may be used, or two or more kinds thereof may be used in combination.

<Other Additives>

To the adhesive of the present invention, as needed, at least one additive hitherto known selected from fluidity modifiers, nucleating agents, antioxidants, heat stabilizers, ultraviolet absorbents, light stabilizers, pigments, dyes, antibacterial agents, antifungal agent, antistatic agents, foaming agents, foaming assistants and fillers, may be added, in a range not detrimental to the object of the present invention.

<Preparation and Use of Adhesive>

The adhesive of the present invention can be obtained, for example, by melt kneading the components in a Banbury mixer, a monoaxial extruder, a multiaxial extruder or the like usually at a temperature ranging from 120 to 230° C., preferably from 150 to 200° C. Bale- or pellet-shaped samples thus prepared can be used for various uses.

In use as a hot-melt adhesive, while it is permitted that adherends are attached to each other and thereafter the adhesive is cured, it is possible that the adhesive that has been cured is heated again to be activated and thereafter adherends are attached to each other. Shapes of the hot-melt adhesive that has been cured include sheet-shape, film-shape, nonwoven fabric-shape, piece-shape and bar-shape.

In the adhesive of the present invention, the content of the ethylene•α-olefin copolymer (A) is usually 10 to 90% by mass, preferably 20 to 70% by mass, and more preferably 30 to 50% by mass, with respect to the whole amount of the adhesive. The content being in the above ranges is preferred in terms of adhesive force and coatability of the adhesive.

When the tackifier is used in the adhesive of the present invention, its content is preferably 60 to 140 parts by mass, and more preferably 70 to 120 parts by mass, based on 100 parts by mass of the ethylene•α-olefin copolymer (A). By the adhesive of the present invention being formed so as to have such a composition as described above, various properties such as flexibility, mechanical properties, heat resistance and adhesive properties are obtainable in a well-balanced manner.

When the wax is used in the adhesive of the present invention, its content is preferably 60 to 140 parts by mass, and more preferably 70 to 120 parts by mass, based on 100 parts by mass of the ethylene•α-olefin copolymer (A). The wax content being in the above ranges is preferred in terms of pressure-sensitive adhesion and flexibility.

Regarding the way the adhesive of the present invention is used as a hot-melt adhesive, the use of a handgun designed for applying a hot-melt adhesive can be mentioned as a preferable example. As a particularly preferred use of the hot-melt adhesive, bonding between cardboards can be mentioned, for example.

The way the adhesive of the present invention is used as a hot-melt adhesive is for example as follows: a sample produced by the above-described production process (adhesive alone) is subjected to a screw extruder having a dice portion whose type is based on T-die method, inflation method, calendaring method or spinning method, where the sample is formed into the shape of a sheet, a film or a nonwoven fabric, which is then fixed in between adherends to be laminated/bonded, followed by heat-bonding. In another way, with the adhesive molded into the shape of a film being heat-molten on one of the adherends, the other adherend being cooled is compression-bonded thereto.

In still another way, the adhesive of the present invention is molten in the above-mentioned screw extruder and then directly inserted between adherends to be laminated, thereby performing thermal bonding. If one of the adherends is a thermoplastic, co-extrusion may be performed for direct bonding; or the adhesive may be directly applied on that adherend, followed by another heat-bonding.

The adhesive of the present invention can be used preferably, for example, for bonding between base materials composed of e.g., a polyolefin resin; for bonding between the base material and a metal material (example: metal plate, metal foil, metal mesh) or other material (example: nonwoven fabric, woven fabric, cloth, paper such as cardboard, glass); and for bonding between the metal materials or between said other materials.

Examples of the above base material are resin sheets, in the form of a single layer or a laminate, which are composed of polyolefin resin (example: polyethylene, polypropylene), polyester resin, polycarbonate resin, polyarylate resin, acrylic resin, polyphenylene sulfide resin, polystyrene resin, vinyl resin, vinyl chloride resin, polyimide resin, epoxy resin or the like.

EXAMPLES

The present invention will be described in greater detail based on examples hereinbelow without limiting the scope of the invention. In the following sections including the examples, "part(s)" means "part (s) by mass" unless otherwise noted.

Properties of ethylene•α-olefin copolymers were measured in the following manners.

<Number-Average Molecular Weight (Mn) and Molecular Weight Distribution (Mw/Mn)>

The number-average molecular weight (Mn) and the molecular weight distribution (Mw/Mn) were measured by gel permeation chromatography (GPC) with the use of a gel permeation chromatograph Alliance GPC-2000 manufactured by Waters, in the following manner. As a separation column, two TSKgel GNH6-HT columns and two TSKgel GNH6-HTL columns were used, wherein each of these columns was 7.5 mm in diameter and 300 mm in length; the column temperature was 140° C.; and as a moving phase, o-dichlorobenzene (manufactured by Wako Pure Chemical Industries, Ltd.) and 0.025% by mass of BHT (Takeda Pharmaceutical Company Limited.) as an antioxidant were used and moved at 1.0 ml/min. A sample concentration was 15 mg/10 ml, and a sample feed amount was 500 μl. A detector was a differential refractometer. As standard polystyrenes, those with a molecular weight of Mw<1000 and Mw>4×10$^6$ were from TOSOH CORPORATION, and those with a molecular weight of 1000≤Mw≤4×10$^6$ were from Pressure Chemical Company.

<Density>

The density was measured in accordance with ASTM D 1505 at 23° C.

<Amount of Double Bond>

The amount of double bond was determined on the basis of $^1$H-NMR of ethylene•α-olefin copolymers ("ECX400P nuclear magnetic resonance apparatus" manufactured by JEOL Ltd.), wherein as signals derived from double bond, vinyl-type double bond, vinylidene-type double bond, 2-substituted olefin-type double bond and 3-substituted olefin-type double bond are observed. From integrated intensity of each signal, an amount of each double bond was determined. A main chain methylene signal of the ethylene•α-olefin copolymers was used as a chemical shift standard (1.2 ppm). The total amount of double bond was defined as the sum of those double bonds. Analysis with the number of 0.1/1000C being quantification limit was performed. For the number of less than 0.1/1000C, if a signal was detected, a calibration curve was extrapolated to calculate an amount of double bond.

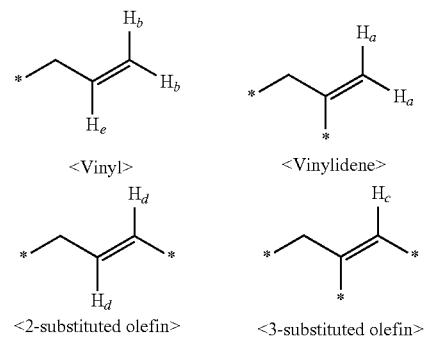

In each formula, * represents a bond with an atom other than a hydrogen atom.

Peaks of hydrogen atoms a to e are observed approximately in ranges described below.

Peak of hydrogen atom a: 4.60 ppm
Peak of hydrogen atom b: 4.85 ppm
Peak of hydrogen atom c: 5.10 ppm Peak of hydrogen atom d: 5.25 ppm
Peak of hydrogen atom e: 5.70 ppm
Equations for determining the amount of double bond are as follows.

Amount of vinyl-type double bond={(integrated intensity of signal b)+(integrated intensity of signal e)}/3

Amount of vinylidene-type double bond=(integrated intensity of signal a)/2

Amount of 2-substituted olefin-type double bond= (integrated intensity of signal d)/2

Amount of 3-substituted olefin-type double bond= (integrated intensity of signal c)

<Melting Point Tm>

Test pieces whose conditions had been adjusted at 23° C.±2° C. for 72 hours or longer in a DSC measurement device were cooled to −40° C. and then heated at a heating rate of 10° C./min to 200° C., being kept at 200° C. for 10 min, and thereafter cooled at a cooling rate of 10° C./min to −20° C., being kept at −20° C. for 1 min, followed by one more heating at a heating rate of 10° C./min. Under this measurement, DSC curves were prepared. A melting point obtained at this time was defined as Tm.

<Glass Transition Temperature Tg>

In a DSC measurement device, test pieces were heated at a heating rate of 10° C./min from room temperature to 200° C., kept at 200° C. for 10 min, and then cooled at a cooling rate of 10° C./min to −100° C., kept at −100° C. for 1 min, and thereafter heated again at a heating rate of 10° C./min to 150° C. Glass transition was observed during the cooling from 200° C. to −100° C.

<MFR>

The MFR was measured in accordance with ASTM D 1238 at 190° C. under 2.16 kg load.

<Melt Viscosity>

The melt viscosity was measured by using a B-type viscometer at 177° C. and at 1.0 rpm.

<Comonomer Content (Composition)>

By analyzing $^{13}C$-NMR spectra, the comonomer content was determined with a precision to the first decimal place.

Production Example 1

A polymerization device made of stainless steel and equipped with an agitating blade with a substantial inner volume of 1 L (number of agitating rotations=500 rpm) was used. In the device filled with liquid, ethylene was continuously copolymerized with 1-butene at a polymerization temperature of 95° C. Through a side portion of the polymerization device to the liquid phase, 0.30 L of hexane, 85 g of ethylene and 160 g of 1-butene, together with 0.1 NL of hydrogen, 0.00035 mmol of bis(1,3-dimethylcyclopentadienyl) zirconiumdichloride, 0.053 mmol in terms of aluminum of a methylaluminoxane/hexane solution and 0.26 mmol of triisobutylaluminum, per hour, were continuously fed. With a polymerization pressure kept at 3.8 MPaG, the copolymerization reaction was thus performed. The hexane solution of ethylene•1-butene copolymer continuously obtained was stored at a holding drum, and thereto 0.3 ml per hour of methanol as a catalyst inactivator was added in order to terminate the polymerization.

The hexane solution of ethylene•1-butene copolymer obtained was discharged every one hour, and put in a 2 L of methanol, where the polymer was precipitated from the polymerization solution. The polymer precipitated was dried under vacuum at 130° C. for 10 hours. As a result, an ethylene•1-butene copolymer (polymer A) was obtained.

The ethylene•1-butene copolymer obtained as above (polymer A) had Mn of 22700, a density of 898 kg/m³, MFR (at 190° C. under 2.16 kg load) of 450 g/10 min, and its yield was 80 g per hour.

Production Example 2 to 3

Production Example 1 was repeated except that in Production Example 1 the 1-butene feed amount and the hydrogen feed amount were changed, resulting in providing ethylene•1-butene copolymers (polymers B and C).

Production Example 4

A polymerization device made of stainless steel and equipped with an agitating blade with a substantial inner volume of 1 L (number of agitating rotations=500 rpm) was used. In the device filled with liquid, ethylene was continuously copolymerized with 1-butene at a polymerization temperature of 95° C. Through a side portion of the polymerization device to the liquid phase, 0.23 L of hexane, 70 g of ethylene, 230 g of 1-butene, together with 0.1 NL of hydrogen, 0.00033 mmol of bis(1,3-dimethylcyclopentadienyl) zirconiumdichloride, 0.050 mmol in terms of aluminum of a methylaluminoxane/hexane solution and 0.25 mmol of triisobutylaluminum, per hour, were continuously fed. With a polymerization pressure kept at 3.8 MPaG, the copolymerization reaction was performed. The hexane solution of ethylene•1-butene copolymer continuously obtained was stored at a holding drum, and thereto 0.3 ml per hour of methanol as a catalyst inactivator was added in order to terminate the polymerization.

The hexane solution of ethylene•1-butene copolymer obtained was discharged everyone hour, and put in a 2 L of methanol, where the polymer was precipitated from the polymerization solution. The polymer precipitated was dried under vacuum at 130° C. for 10 hours. As a result, an ethylene•1-butene copolymer (polymer D) was obtained.

The ethylene•1-butene copolymer obtained as above (polymer D) had Mn of 23100, a density of 908 kg/m³, MFR (at 190° C. under 2.16 kg load) of 420 g/10 min, and its yield was 80 g per hour.

Production Example 5

Production Example 4 was repeated except that in Production Example 4 the 1-butene feed amount and the hydrogen feed amount were changed, resulting in providing an ethylene•1-butene copolymer (polymer E).

TABLE 1

| Item | Unit | Production Example 1 Polymer A | Production Example 2 Polymer B | Production Example 3 Polymer C | Production Example 4 Polymer D | Production Example 5 Polymer E | Polymer F |
|---|---|---|---|---|---|---|---|
| Base polymer | — | EBR | EBR | EBR | EBR | EBR | EOR |
| Comonomer content | mol % | 8 | 8 | 7 | 6 | 15 | 14 |
| Mn (in terms of polystyrene) | — | 22,700 | 23,900 | 23,800 | 23,100 | 23,500 | 19,700 |
| Mw/Mn | — | 2.0 | 2.1 | 2.1 | 2.1 | 2.0 | 2.0 |

TABLE 1-continued

| Item | Unit | Production Example 1 Polymer A | Production Example 2 Polymer B | Production Example 3 Polymer C | Production Example 4 Polymer D | Production Example 5 Polymer E | Polymer F |
|---|---|---|---|---|---|---|---|
| Density | kg/m$^3$ | 898 | 898 | 902 | 908 | 876 | 874 |
| MFR (190° C., 2.16 kg) | g/10 min. | 450 | 330 | 340 | 420 | 380 | 550 |
| Melt viscosity (177° C., 1.0 rpm) | mPa · s | 20,000 | 28,000 | 27,000 | 22,000 | 24,000 | 17,000 |
| Vinyl-type double bond | Number/1000 C | 0.026 | 0.030 | 0.022 | 0.032 | 0.025 | 0.046 |
| Vinylidene-type double bond | Number/1000 C | 0.058 | 0.080 | 0.055 | 0.065 | 0.099 | 0.153 |
| 2-substituted olefin-type double bond | Number/1000 C | 0.019 | 0.020 | 0.017 | 0.021 | 0.025 | 0.154 |
| 3-substituted olefin-type double bond | Number/1000 C | 0.005 | 0.014 | 0.008 | 0.009 | 0.023 | 0.147 |
| Total amount of double bond | Number/1000 C | 0.108 | 0.144 | 0.102 | 0.127 | 0.172 | 0.500 |
| DSC Tg | ° C. | −50 | −50 | −48 | −40 | −65 | −60 |
| DSC Tm | ° C. | 90 | 91 | 95 | 100 | 70 | 72 |
| Tm − Tg | ° C. | 140 | 141 | 143 | 140 | 135 | 132 |

Polymer F: ethylene•1-octene copolymer "AFFINITY GA1950" (manufactured by The Dow Chemical Company)

Example 1

To a flask heated to 150° C., the polymer A obtained in Production Example 1 in an amount of 40 parts by mass, a tackifier in an amount of 30 parts by mass, and a wax in an amount of 30 parts by mass were introduced, and with an agitating blade placed therein, were mixed with each other at a rotation number of 50 rpm at a temperature of 150° C. for 10 min, to prepare an adhesive. As the tackifier, ARKON P-125 (manufactured by Arakawa Chemical Industries, Ltd., commercially available product) was used. As the wax, Mitsui HiWAX NL100 (manufactured by Mitsui Chemicals, Inc.; polyethylene type, density=920 kg/m$^3$, melting point=103° C., melt viscosity (140° C., 6.0 rpm)=200 mPa·s) was used.

Examples 2 to 5 and Comparative Example 1

Example 1 was repeated except that in Example 1 the type of the polymer was changed as shown in Table 2, to prepare respective adhesives.

[Evaluation of Adhesion]

The adhesive obtained above was applied, by using a handgun designed for applying a hot-melt adhesive (product name "GX600Pro", manufactured by Technos, Co., Ltd.) heated to 180° C., on a cardboard commercially available (width 15 mm×length 100 mm×thickness 5 mm) under conditions in which a test environment temperature was 23° C. and an open time was 2 seconds such that the adhesive was applied in such a manner as to create a columnar shape of 1 mm in diameter and 15 mm in length on the cardboard, which was then attached to a cardboard with the same size. By performing solidification under the condition of a setting time of 1 second, the two cardboards with the same size were attached to each other. A test piece was thus obtained.

To evaluate the heat resistance of the adhesive, a sinker weighing 300 g was allowed to hang down from one of the cardboards of the test piece under 50° C. or 75° C. environment, and left for 60 minutes. Thereafter, adhesion condition was observed. Where no peeling was observed was indicated as "AA", and where peeling was observed was indicated as "BB".

To evaluate the cold resistance of the adhesive, the test piece was left under −30° C. or 0° C. environment for 5 hours. Thereafter, the test piece was subjected to T-peel test (in accordance with JIS K6854-3, peeling rate: 50 mm/min, test temperature: 23° C.) in order to see if there was any fracture in the base material (cardboard) and the adhesive. Where the base material was fractured was indicated as "AA", and where part of the adhesive was fractured was indicated as "BB". When the base material is fractured, it shows that adhesion of the adhesive to the base material and the cohesion of the adhesive itself are superior to the cohesion of the base material.

[Evaluation of Heat Stability]

The adhesive obtained above in an amount of 50 g was put in a 100 ml beaker and stored at 180° C. in air to observe hue change of the adhesive. The hue change was observed immediately after, 1 week after and 2 weeks after the adhesive was put in the beaker.

TABLE 2

| | | | Example 1 | Example 2 | Example 3 | Example 4 | Example 5 | Comparative Example 1 |
|---|---|---|---|---|---|---|---|---|
| Adhesive | Polymer A | wt % | 40 | | | | | |
| | Polymer B | wt % | | 40 | | | | |
| | Polymer C | wt % | | | 40 | | | |
| | Polymer D | wt % | | | | 40 | | |
| | Polymer E | wt % | | | | | 40 | |
| | Polymer F | wt % | | | | | | 40 |
| | Tackifier | wt % | 30 | 30 | 30 | 30 | 30 | 30 |
| | Wax | wt % | 30 | 30 | 30 | 30 | 30 | 30 |
| Evaluation | Heat resistance | 50° C. | AA | AA | AA | AA | AA | AA |
| | | 75° C. | AA | AA | AA | AA | BB | BB |
| | Cold resistance | −30° C. | AA | AA | AA | BB | AA | AA |
| | | 0° C. | AA | AA | AA | AA | AA | AA |
| | Evaluation of heat stability | Before evaluation | transparent | transparent | transparent | transparent | transparent | transparent |
| | | 1 week after | yellow | yellow | yellow | yellow | yellow | brown |
| | | 2 weeks after | brown | brown | brown | brown | brown | black |

The adhesive obtained in Comparative Example 1 used the ethylene•1-octene copolymer wherein the total amount of double bond was not less than 0.5, and therefore its hue change was considerable and thus its heat stability was poor.

The adhesives obtained in Examples 1 to 5 used any of the copolymers wherein the total number of double bond per 1000 carbon atoms was less than 0.5, and therefore their hue change was small and thus their heat stability was superior.

The adhesives obtained in Examples 1 to 4 used any of the ethylene•1-butene copolymers having a density and Mn in the specific ranges, and therefore were more superior in adhesion under high-temperature environment. Further, the adhesives obtained in Examples 1 to 3 used any of the ethylene•1-butene copolymers having a density of from 896 to 905 kg/m$^3$, and therefore superior also in adhesion under low-temperature environment.

The invention claimed is:

1. An adhesive comprising an ethylene•α-olefin copolymer (A) having a number-average molecular weight of 5000 to 100000 in terms of polystyrene as measured by gel permeation chromatography, a melt flow rate at 190° C. under 2.16 kg load (MFR, ASTM D 1238) of 100 to 500 g/10 min, and a density of 896 to 908 kg/m$^3$, wherein in the ethylene•α-olefin copolymer (A), a total number of vinyl double bond, vinylidene double bond, 2-substituted olefin double bond and 3-substituted olefin double bond is less than 0.5 per 1000 carbon atoms as measured by $^1$H-NMR spectroscopy and wherein a content of structural units derived from ethylene and a content of structural units derived from the α-olefin total 100 mol % of all repeating structural units in the ethylene•α-olefin copolymer (A).

2. The adhesive according to claim 1, wherein the ethylene-α-olefin copolymer (A) has a number-average molecular weight of 20000 to 100000 in terms of polystyrene as measured by gel permeation chromatography and has a density of 896 to 908 kg/m$^3$.

3. The adhesive according to claim 1, wherein the ethylene-α-olefin copolymer (A) has a density of 896 to 905 kg/m$^3$.

4. The adhesive according to claim 1, wherein in the ethylene-α-olefin copolymer (A), the number of each of vinylidene double bond, 2-substituted olefin double bond and 3-substituted olefin double bond is less than 0.2 per 1000 carbon atoms as measured by $^1$H-NMR spectroscopy.

5. The adhesive according to claim 1, wherein in the ethylene-α-olefin copolymer (A), the number of vinyl double bond is less than 0.2 per 1000 carbon atoms as measured by $^1$H-NMR spectroscopy.

6. The adhesive according to claim 1, wherein in the ethylene-α-olefin copolymer (A), the total number of vinyl double bond, vinylidene double bond, 2-substituted olefin double bond and 3-substituted olefin double bond is less than 0.4 per 1000 carbon atoms as measured by $^1$H-NMR spectroscopy.

7. The adhesive according to claim 1, which is a hot-melt adhesive.

* * * * *